April 22, 1952     L. J. SCHULZE     2,594,077
GAUGING DEVICE
Filed May 10, 1951
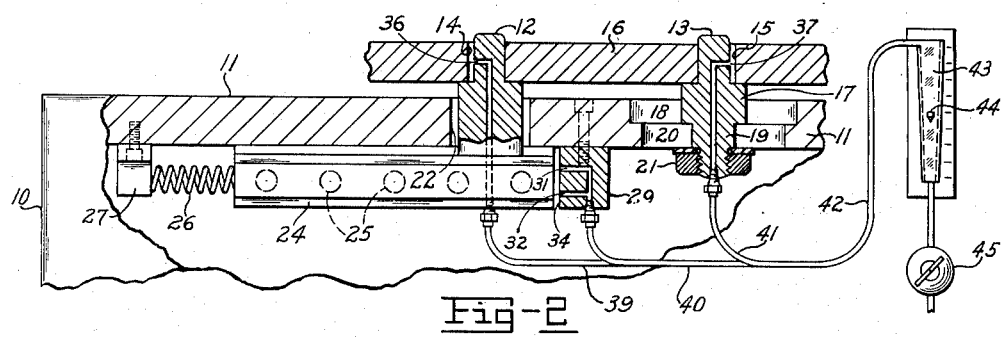
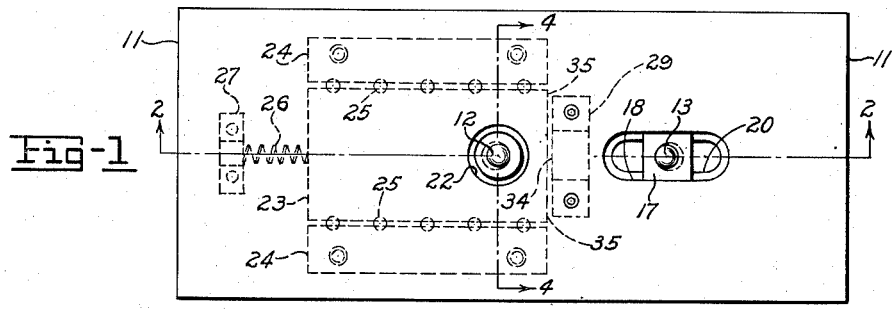
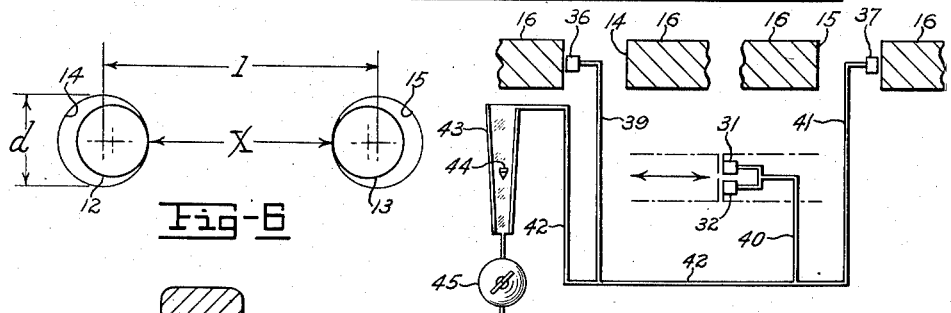
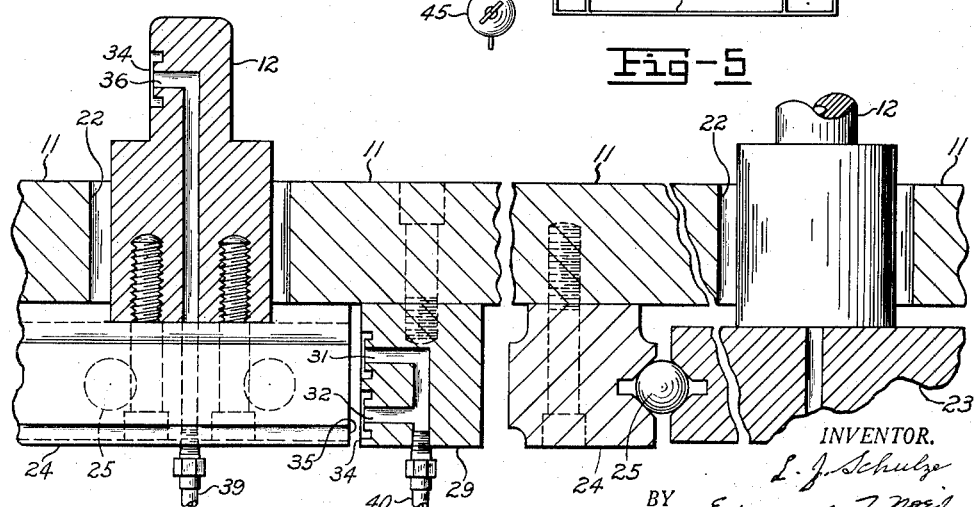

Patented Apr. 22, 1952

2,594,077

UNITED STATES PATENT OFFICE 2,594,077

GAUGING DEVICE

Louis J. Schulze, Dayton, Ohio, assignor to The Sheffield Corporation, Dayton, Ohio, a corporation of Ohio Application May 10, 1951, Serial No. 225,471

3 Claims. (Cl. 73—37.5)

This invention relates to gauging apparatus and more particularly to apparatus for gauging the center spacing of spaced holes.

One object of the invention is the provision of a gauging apparatus adapted to gauge the center spacing of holes in a part to be gauged, and embodying relatively movable spindles or gauging members adapted to enter the holes and one of the spindles controlling a gauging element, the spindles and the gauging element having orifices all connected to a common flow indicator which directly compares the hole spacing in the part with a desired or standard hole spacing.

Another object of the invention is the provision of gauging apparatus having upwardly extending fixed and movable spindles adapted to enter the holes in a part to be gauged, the movable spindle controlling the spacing between two gauging elements, a common flow indicator being provided with connections to air gauging orifices in the spindles and similar air gauging orifices in the gaugng element to determine the amount of flow taking place through gauging orifices so that direct readings of the hole spacing can be obtained.

Other objects and advantages of the invention will be apparent from the following description, the appended claims and the accompanying drawings, in which Fig. 1 is a top view of gauging apparatus embodying the present invention.

Fig. 2 is a vertical sectional view on the line 2—2 of Fig. 1, showing the gauging device with its connections to a flow indicator gauge.

Fig. 3 is an enlarged sectional view of the movable gauging spindle.

Fig. 4 is an enlarged section of the view on the line 4—4 of Fig. 1.

Fig. 5 is a diagrammatic illustration showing the association of the several gauging nozzles with the part to be gauged, and Fig. 6 is a diagrammatic showing of the gauging spindles and the holes in the part.

Referring more particularly to the drawing, in which the same reference numerals are used to designate like parts in the different views, 10 generally designates the gauge base or support, having an upper wall 11 through which two gauging spindles 12 and 13 extend. These spindles are of such size that they can readily enter the holes 14 and 15 in the part 16 to be gauged, the gauging apparatus being adapted to measure or compare the distance between the hole centers even though the actual diameter of the holes may vary slightly from a predetermined or desired size.

The gauging spindle 13 has a rectangular lower portion 17 received and guided in parallel guideways 18 in the wall 11. An extension 19 of reduced diameter extends through a slot 20 in the wall 11 and fastening nut 21 serves to hold the spindle in fixed position but permits adjustment in position on the wall 11 so as to adapt the gauge to different parts in which the hole spacing may vary.

The spindle 12 projects with suitable clearance through a round hole 22 in the wall 11 and is fixed at its lower end to a slide 23 which is guided for movement towards and from the fixed spindle 13 by guideways 24, anti-friction rollers 25 being preferably employed between the guideways and the slide. A spring 26 engages at one end against the slide 23 and the other end presses against the fixed abutment 27 and serves to urge the slide 23 toward the right as viewed in Fig. 2. The right hand end of the slide 23, as viewed in Fig. 2, constitutes a gauging element normally slightly spaced from a second gauging element 29 which is fixed on the lower side of the wall 11. One of these gauging elements, preferably the element 29, is provided with gauging orifices as shown in Fig. 3. The ends of these orifices are recessed a few ten-thousandths of an inch back of the flat front surface 34 of the element 29 so that some air will always flow through the orifices and be discharged through suitable discharge grooves to the atmosphere. The amount of air flowing from these orifices is determined by the spacing between the element 29 and the flat surface 35 on the slide 23.

The spindle 12 is provided with a gauging orifice 36 slightly recessed from the cylindrical surface of the spindle. Spindle 13 is also provided with a similar orifice 37, the two orifices 36 and 37 facing in opposite directions as will be apparent from Fig. 2. They are provided on opposite sides of the spindles and in the common plane containing the axes of the spindles. The spring 26 urges the slide 23 in such direction that clearance will be taken up between the work piece and those sides of the spindles that do not contain the orifices so that the distance between an orifice and the adjacent side of the hole will represent the full difference in diameter between the hole size and the spindle size.

The four gauging nozzles 31, 32, 36 and 37 are connected to fluid passages including conduits 39, 40 and 41, all leading to a common conduit 42 which connects to the discharge end of a flow indicating gauge of any suitable construction. As shown, this gauge is in the form of an upwardly flaring transparent tube 43 containing a float 44. The lower end of the tube is supplied with air under pressure from a pressure regulating valve 45. Air under controlled pressure thus flows upwardly through the tube and the height of the float indicates the amount of air flow at any time through the several gauging nozzles.

The size of the orifices in the gauging element 29 and the normal spacing existing between the ends of those orifices and the adjacent surface 35 of the slide is so related to the normal spacing of the orifices 36 and 37 from the sides of the holes, and the size of those orifices, as to produce the same combined flow through the orifices 36 and 37 as the flow through the orifices in the gauging element 29 when a reference part or master having the proper hole spacing is applied. Preferably all four orifices are of the same size and of similar construction and the space between the gauging elements is the same as the space between the side of a hole and the gauging orifice in its respective spindle when the master is in place. Under these conditions and with a hole spacing of the required amount in the set up master, a certain indication will be produced on the gauge or indicator tube 43. This condition is illustrated in Figs. 5 and 6 where $l$ is the distance between the hole centers, $x$ the distance between the insides of the holes and $d$ the desired hole diameter. If the set up master is removed and a part to be gauged is substituted and the part has a smaller hole spacing less than $l$ than the master, then the spring 26 will move the spindle 12 towards the right and correspondingly reduce the clearance between the slide 23 and the gauging element 29. If the hole diameters are the same as the master then there will be no change in the spacing between the orifices in the spindles and the sides of the holes. There will, however, be a smaller amount of air flowing through tube 43 due to the decreased clearance between the gauging orifices 31 and 32 and the slide and this will be evidenced by a lowering of the float 44. If on the contrary the hole center spacing $l$ is the same as the master but one hole size is larger than $d$ by two thousandths of an inch, for example, then the spindle 12 will be displaced one thousandth of an inch from normal toward the right by the spring 26 so that one thousandth of an inch smaller spacing exists at the ends of the orifices 31 and 32 than when the master is employed. The increased size of the hole, however, produces an increase of two thousandths in the spacing between the end of the spindle orifice 36 or 37 and the adjacent side of the hole, this increase for the spindle orifice being just twice as much as the decrease in clearance of the two orifices 31 and 32 so that the float reading is the same as when the master was used. This is so because the combined flow from the orifices in the gauging element is reduced the same amount as the increase in flow through the two gauging orifices in the spindles. The arrangement as will be apparent, automatically compensates for any variation in the actual hole diameter from the hole size of the master and the scale opposite the float can be calibrated for actual hole spacing.

In the drawing the amount of clearance between the spindles and the inner sides of the holes is shown on a very exaggerated scale. This is also true in each case in illustrating the clearance spacing between the end of an orifice and the part associated with it. Actually, these distances may be of the order of a thousandth of an inch.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus for gauging the center spacing of spaced holes in a part comprising a support having an upwardly extending fixed spindle, a second spindle parallel to the fixed spindle, means supporting said second spindle on said support for movement towards and from the fixed spindle at right angles to the spindle axes, a pair of gauging elements one fixed to the support and one fixed with respect to the second spindle, an air gauging orifice on one side of the fixed spindle for cooperation with one of the holes in the part to be gauged, an air gauging orifice on the other side of the second spindle for cooperation with the other hole in the part to be gauged, air gauging orifices carried by one of said gauging elements for cooperation with the other gauging element, the flow through the gauging orifices of the gauging element being the same as the combined flow through the gauging orifices on the spindles when a part having the desired hole spacing is applied to the apparatus, means urging the second spindle in a direction to space the ends of the spindle orifices from the sides of the holes adjacent thereto, and common means for showing the total flow of air supplied under pressure through all of said orifices.

2. Gauging apparatus for gauging the center spacing of spaced holes in a part comprising a support having an upwardly extending fixed spindle, a second spindle parallel to the fixed spindle, means supporting said second spindle on said support for movement towards and from the fixed spindle at right angles to the spindle axes, a pair of gauging elements one fixed to the support and one fixed with respect to the second spindle, an air gauging orifice on one side of the fixed spindle for cooperation with one of the holes in the part to be gauged, an air gauging orifice on the other side of the second spindle for cooperation with the other hole in the part to be gauged, two air gauging orifices carried by one of said gauging elements for cooperation with the other gauging element, all the orifices being of the same size and the flow through each being the same when a part having the desired hole spacing is applied to the apparatus, means urging the second spindle in a direction to space the ends of the spindle orifices from the sides of the holes adjacent thereto, and common means for showing the total flow of air supplied under pressure through all of said orifices.

3. Gauging apparatus for gauging the center spacing of spaced holes in a part comprising a support having an upwardly extending fixed spindle, a second spindle parallel to the fixed spindle, slide means supporting said second spindle on said support for movement towards and from the fixed spindle at right angles to the spindle axes, a gauging element fixed to the support, an air gauging orifice on one side of the fixed spindle for cooperation with one of the holes in the part to be gauged, an air gauging orifice on the other side of the second spindle for cooperation with the other hole in the part to be gauged, a pair of air gauging orifices carried by said gauging element for cooperation with the end of said slide means, the combined flow through the gauging orifices of the gauging element being the same as the combined flow through the gauging orifices on the spindles when a part having the desired hole spacing is applied to the apparatus, means urging the second spindle in a direction to space the ends of the spindle orifices from the sides of the holes adjacent thereto, and common means for showing the total flow of air supplied under pressure through all of said orifices.

LOUIS J. SCHULZE.

No references cited.